United States Patent
Huelsmann et al.

(10) Patent No.: US 9,546,273 B2
(45) Date of Patent: Jan. 17, 2017

(54) POLYAMIDE MIXTURE

(71) Applicants: Klaus Huelsmann, Haltern am See (DE); Heinrich Peirick, Coesfeld (DE); Maximilian Gruhn, Marl (DE); Luca Castelli, Genoa (IT)

(72) Inventors: Klaus Huelsmann, Haltern am See (DE); Heinrich Peirick, Coesfeld (DE); Maximilian Gruhn, Marl (DE); Luca Castelli, Genoa (IT)

(73) Assignee: EVONIK DEGUSSA GmbH, Essen (DE)

( * ) Notice: Subject to any disclaimer, the term of this patent is extended or adjusted under 35 U.S.C. 154(b) by 0 days.

(21) Appl. No.: 14/504,475

(22) Filed: Oct. 2, 2014

(65) Prior Publication Data
US 2015/0099847 A1    Apr. 9, 2015

(30) Foreign Application Priority Data

Oct. 4, 2013  (DE) .................. 10 2013 220 135

(51) Int. Cl.
*C08G 69/26* (2006.01)
*C08L 77/00* (2006.01)
*C08L 77/06* (2006.01)

(52) U.S. Cl.
CPC .............. *C08L 77/06* (2013.01); *C08G 69/26* (2013.01); *C08L 2201/10* (2013.01); *C08L 2205/025* (2013.01)

(58) Field of Classification Search
None
See application file for complete search history.

(56) References Cited

U.S. PATENT DOCUMENTS

| | | |
|---|---|---|
| 3,393,210 A | 7/1968 | Speck et al. |
| 5,360,891 A | 11/1994 | Wenzel et al. |
| 5,696,202 A | 12/1997 | Torre |
| 6,204,355 B1 | 3/2001 | Dalla Torre et al. |
| 8,759,437 B2 * | 6/2014 | Pawlik et al. ............... 524/504 |
| 2007/0122615 A1 | 5/2007 | Mutsuda et al. |
| 2010/0003524 A1 | 1/2010 | Luetzeler et al. |
| 2010/0003534 A1 | 1/2010 | Luetzeler et al. |
| 2010/0055425 A1 | 3/2010 | Luetzeler et al. |
| 2010/0140846 A1 | 6/2010 | Montanari et al. |
| 2011/0105697 A1 * | 5/2011 | Buhler et al. ............... 525/432 |
| 2012/0142810 A1 * | 6/2012 | Buhler et al. ............... 523/100 |

FOREIGN PATENT DOCUMENTS

| | | |
|---|---|---|
| DE | 1 595 150 | 3/1970 |
| DE | 43 10 970 A1 | 10/1994 |
| EP | 0 619 336 A2 | 10/1994 |
| EP | 0 725 101 A1 | 8/1996 |
| EP | 0 837 087 A1 | 4/1998 |
| EP | 1 595 907 A1 * | 5/2005 |
| EP | 1 595 907 A1 | 11/2005 |
| EP | 2 057 015 A1 | 5/2009 |
| EP | 2 816 072 A1 | 12/2014 |
| WO | WO 2011/138300 A1 * | 11/2011 |

OTHER PUBLICATIONS

European Search Report issued Feb. 11, 2015 in Patent Application No. 14186745.7 (with English translation of categories of documents).
Office Action issued Sep. 22, 2016 in European Patent Application No. 14 186 745.7 with Engiish translation.

* cited by examiner

*Primary Examiner* — Susannah Chung
*Assistant Examiner* — Robert T Butcher
(74) *Attorney, Agent, or Firm* — Oblon, McClelland, Maier & Neustadt, L.L.P.

(57) ABSTRACT

A composition, containing at least 50% by weight of a polyamide fraction which comprises: a) from 50 to 95 parts by weight of a polyamide having as copolymerized units bis(4-aminocyclohexyl)methane (PACM) and a linear dicarboxylic acid having from 8 to 18 C atoms; and b) from 50 to 5 parts by weight of a linear aliphatic polyamide having an average of from 8 to 12 C atoms in the monomer units, where the sum of the parts by weight of a) and b) is 100 is provided. The composition can be processed to give a moulded article having high transparency, high toughness and high resistance to chemicals, to solvents and to stress cracking.

15 Claims, No Drawings

POLYAMIDE MIXTURE

CROSS REFERENCE TO RELATED APPLICATIONS

This application claims priority to DE 102013220135.4, filed Oct. 4, 2013, the disclosure of which is incorporated herein by reference in its entirety.

BACKGROUND OF THE INVENTION

The invention relates to a mixture which comprises a transparent polyamide, and also comprises a semicrystalline polyamide that in the pure state is opaque. As a blend, this type of polyamide mixture is transparent; and corresponding moulding compositions have better mechanical properties than the individual components.

Transparent polyamides made of bis(4-aminocyclohexyl) methane (PACM) with from 30 to 70% content of trans, trans-stereoisomer, and also dodecanedoic acid, are known from DE 15 95 150 A1. EP 0 619 336 A2 describes corresponding transparent polyamides made of from 35 to 60 mol % of trans,trans-bis(4-amino-cyclohexyl)methane and from 65 to 40 mol % of other diamines, and also linear aliphatic dicarboxylic acids. According to the description of EP 0 619 336 A2, the transparent polyamides of that type are crystalline; they therefore have good resistance to solvents, and also to stress cracking.

EP 0 725 101 A1 describes transparent, amorphous polyamides which are composed either of alkyl-substituted cycloaliphatic diamines having from 14 to 22 C atoms and of unbranched aliphatic dicarboxylic acids having from 8 to 14 C atoms or of unbranched aliphatic diamines having from 8 to 14 C atoms and of cycloaliphatic dicarboxylic acids. It is mentioned that these polyamides can also be used to produce blends or alloys with aliphatic homopolyamides, but no advantages of any type are alleged for these. No specific relevant examples are disclosed. The amorphous polyamides of described in EP 0 725 101 cannot be based on PACM.

Likewise, EP 0 837 087 A1 does not disclose the use of PACM for the production of the transparent polyamides. It is possible to produce alloys or blends with polyamides such as PA11 or PA12, these likewise being allegedly transparent. Otherwise nothing is said about the properties of alloys or blends with PACM. It remains unclear whether alloys or blends of that type are at all advantageous.

EP 1 595 907 A1 describes transparent amorphous polyamides based on diamines and tetradecanedoic acid, and also mixtures thereof with semicrystalline polyamides. PACM can be used as diamine, and specific mention is made here of PACM20, which comprises 20% of trans,trans-isomer. However, there is no explicit disclosure of the mixture of a PACM-based transparent amorphous polyamide with a semicrystalline polyamide.

The polyamides based on PACM have valuable performance characteristics, and with suitable composition are transparent, but microcrystalline and therefore resistant to solvents and to stress cracking; they have a high level of mechanical properties, for example impact resistance. However, there remains a need for improved puncture resistance. This is important in the application sector of spectacle frames and spectacle lenses, in particular in "sports" applications and "defence" applications. In these applications the material is characterized through a ball-impact test where a ball of defined weight is propelled with a defined velocity onto a spectacle frame or a spectacle lens. Another disadvantage of these polyamides is high melt viscosity under processing conditions, making it difficult to produce filigree components. Although the melt viscosity can be lowered by using the corresponding polyamide with lower molecular weight, this considerably impairs mechanical properties, in particular impact resistance and puncture resistance. The lower molecular weight also leads to lower tensile strain at break, high notch sensitivity and lower ageing resistance on exposure of the mouldings to heat or moisture.

The object of the invention consists in improving the processability of the said polyamides while avoiding any significant impairment of transparency, of resistance to solvents and to stress cracking, and also of mechanical properties. Another aspect of the object consists in improving the puncture resistance, breaking strength, notch sensitivity and ageing performance of corresponding mouldings, while avoiding impairment of transparency, resistance to solvents and to stress cracking.

SUMMARY OF THE INVENTION

This object and others has been achieved by the present invention, the first embodiment of which includes a composition, comprising:

at least 50% by weight of a polyamide fraction which comprises:

a) from 50 to 95 parts by weight of a polyamide having as copolymerized units bis(4-aminocyclohexyl)methane (PACM) and a linear dicarboxylic acid having from 8 to 18 C atoms; and b) from 50 to 5 parts by weight of a linear aliphatic polyamide having an average of from 8 to 12 C atoms in the monomer units, where the sum of the parts by weight of a) and b) is 100.

In one aspect of the first embodiment the composition is in a form of a pellet mixture, a powder mixture or a blend.

In another aspect of the first embodiment the linear dicarboxylic acid is selected from the group consisting of octanedioic acid, nonanedioic acid, decanedoic acid, undecanedoic acid, dodecanedoic acid, tridecanedoic acid, tetradecanedoic acid, pentadecanedoic acid, hexadecanedoic acid, heptadecanedoic acid and octadecanedoic acid.

In a further aspect of the first embodiment, a trans,trans-isomer content of the bis(4-aminocyclohexyl)methane (PACM) is from 30 to 70% by weight of total PACM.

In other embodiments the present invention provides molded articles comprising the composition of the first embodiment including all the aspects described.

The forgoing description is intended to provide a general introduction and summary of the present invention and is not intended to be limiting in its disclosure unless otherwise explicitly stated. The presently preferred embodiments, together with further advantages, will be best understood by reference to the following detailed description taken in conjunction with the Examples an Claims that follow.

DETAILED DESCRIPTION OF THE PREFERRED EMBODIMENTS

As used herein, the words "a" and "an" and the like carry the meaning of "one or more." The phrases "selected from the group consisting of," "chosen from," and the like include mixtures of the specified materials. Terms such as " contain(s)" and the like are open terms meaning 'including at least' unless otherwise specifically noted. Numeric ranges that are listed include all values and subranges within the broad range unless otherwise defined.

According to the present invention, the first embodiment provides a mixture which is composed of at least 50% by weight, preferably at least 60% by weight, particularly preferably at least 70% by weight, with particular preference at least 80% by weight and very particularly preferably at least 90% by weight, or at least 95% by weight, of a polyamide fraction which is composed of a) from 50 to 95 parts by weight, preferably from 60 to 92 parts by weight, particularly preferably from 65 to 90 parts by weight, with particular preference from 70 to 88 parts by weight and very particularly preferably from 75 to 88 parts by weight, of PA PACMX (where X=from 8 to 18) and also b) from 50 to 5 parts by weight, preferably from 40 to 8 parts by weight, particularly preferably from 35 to 10 parts by weight, with particular preference from 30 to 12 parts by weight and very particularly preferably from 25 to 12 parts by weight, of a linear aliphatic polyamide having an average of from 8 to 12 C atoms in the monomer units, where the sum of the parts by weight is 100.

The term mixture may be interpreted broadly. For example it may mean a pellet mixture in which the components according to a) and b), in each case in the form of pellets, are combined and are mechanically mixed—in the form of solids mixture. The pellets may additionally comprise other additives which are described in more detail below. The pellet mixture may be processed through melting, mixing and shaping to give a moulding. It is advisable here to mix the melt thoroughly, in order to obtain a homogeneous moulding. Suitable mixing assemblies include kneaders or extruders; the processing to give the moulding may take place through injection moulding, extrusion, compression processes or rolling.

The mixture can correspondingly also be a powder mixture in which the components a) and, respectively, b), in each case in the form of powder, are combined and mechanically mixed. The powder here can also comprise, alongside the component according to a) and, respectively b), other additions which are described in more detail below. The powder mixture can be processed through melting, mixing and shaping to give a moulding. Here again, it is advisable to mix the melt thoroughly, in order to obtain a homogeneous moulding.

An advantage of this type of pellet mixture or powder mixture is that there is no need for melting to form a blend, and it is therefore possible to save costs of energy. This may be particularly advantageous in small-run production.

The mixture may moreover also be a blend produced through mixing in the melt, discharge and comminution. The term blend according to the present invention includes multiphase mixtures where the individual components are present in the form of domains, and also mixtures where the compatibility of the individual components is so high that these have become mixed on the molecular scale. Another term often used synonymously for such a blend is alloy. The mixing in the melt may be conducted in a kneading assembly as is conventionally known, the discharge generally takes place in the form of strand and the methods generally used for communition include granulation, breaking or grinding. The blend according to the present invention may also comprise, in addition to the component according to a) and, respectively b), other additions which are described in more detail below; the term moulding composition may also be used to describe this general form of blend. The moulding composition may be in the form of pellet, broken material or powder. It may be processed to give a moulded article through melting and shaping by methods conventionally known to the person skilled in the art.

The invention also provides the moulded articles produced from the mixture according to the mixtures described and include mouldings, films, bristles and/or fibres.

The nomenclature applied for the polyamides is in accordance with EN ISO 1874-1. Accordingly, PA PACMX denotes a polyamide made of monomer units which derive from bis(4-aminocyclohexyl)methane (PACM) and from a linear dicarboxylic acid having X C atoms. The following dicarboxylic acids are provided as examples, but are not limiting:

X=8: octanedioic acid (suberic acid)
X=9: nonanedioic acid (azelaic acid)
X=10: decanedioic acid (sebacic acid)
X=11: undecanedioic acid
X=12: dodecanedioic acid
X=13: tridecanedioic acid (brassylic acid)
X=14: tetradecanedioic acid
X=15: pentadecanedioic acid
X=16: hexadecanedioic acid
X=17: heptadecanedioic acid
X=18: octadecanedioic acid In one preferred embodiment X may be an even number; in another preferred embodiment X may be from 8 to 12 and particularly from 10 to 12.

The PA PACMX may be produced from PACM and the dicarboxylic acid through polycondensation in the melt by conventionally known processes. However, it may also be possible to use derivatives thereof, for example the diisocyanate which derives from PACM, or a dicarboxylic diester.

PACM takes the form of a mixture cis,cis-, cis,trans- and trans,trans-isomer. It may be obtained commercially with various isomer ratios. In one preferred embodiment the trans,trans-isomer content of the PACM or of the derivative used thereof is from 30 to 70%, and particularly from 35 to 65%.

In another preferred embodiment the PA PACMX may be microcrystalline and its enthalpy of fusion, measured in accordance with ISO 11357, in the 2nd heating procedure with a heating and cooling rate of 20° C./min, is from 5 to 40 J/g, and particularly from 8 to 35 J/g.

In one preferred embodiment, the PA PACMX may be transparent, with a transmission of at least 85% and particularly at least 90%, and with haze less than 3%, and particularly less than 2%, both determined in accordance with ASTM D1003 on injection-moulded test specimens of thickness 2 mm.

The linear aliphatic polyamide b) according to the present invention has on average from 8 to 12 C atoms in the individual monomer units. It may be produced from a combination of diamine and dicarboxylic acid, from ω-aminocarboxylic acid and/or from the corresponding lactam. The monomer units may derive from lactam, ω-aminocarboxylic acid, diamine and, respectively, dicarboxylic acid and as examples the following polyamides are included as examples but not limiting examples.

Average 8 C atoms: PA88, PA79, PA97, PA610, PA106
Average 8.5 C atoms: PA 89, PA98, PA611, PA116, PA512
Average 9 C atoms: PA99, PA810, PA108, PA612, PA126
Average 9.5 C atoms: PA910, PA109, PA811, PA118, PA613, PA136, PA514
Average 10 C atoms: PA10, PA1010, PA812, PA128, PA614, PA146
Average 10.5 C atoms: PA1011, PA813, PA138, PA516
Average 11 C atoms: PA11, PA1012, PA1210, PA913, PA139, PA814, PA148, PA616

Average 11.5 C atoms: PA1112, PA1211, PA1013, PA1310, PA914, PA149, PA815, PA617, PA518

Average 12 C atoms: PA12, PA1212, PA1113, PA1014, PA1410, PA816, PA618

Other suitable polyamides of the invention may include copolyamides which, on the basis of suitable comonomer selection, comply with the condition that the monomer units comprise an average of from 8 to 12 C atoms, for example the copolyamide made of laurolactam, decanediamine and dodecanedioic acid (co-PA12/1012).

Mixtures of corresponding polyamides, having adequate compatibility with one another may be advantageous within the embodiments of the invention.

In one preferred embodiment the linear aliphatic polyamide b) may be semicrystalline with an enthalpy of fusion, measured in accordance with ISO 11357 in the 2nd heating procedure and with a heating and cooling rate of 20° C./min, of at least 20 J/g, particularly at least 25 J/g and in particular at least 30 J/g.

The relative solution viscosity $\eta_{rel}$ of the linear aliphatic polyamide b) may preferably be from 1.3 to 2.4, particularly preferably from 1.4 to 2.2, and with particular preference tom 1.5 to 2.1. $\eta_{rel}$ is determined in accordance with ISO 307 at 23° C. in a 0.5% by weight solution in m-cresol. If the object is to achieve a flowable melt, it is advantageous to use a linear aliphatic polyamide with low relative solution viscosity $\eta_{rel}$, for example in the range from 1.3 to 1.9, preferably in the range from 1.3 to 1.8, and particularly preferably in the range from 1.3 to 1.7.

In one embodiment the PA PACMX may comprise monomer units which derive from PACM and octanedioic acid, and the linear aliphatic polyamide b) is one described above.

In another embodiment, the PA PACMX may comprise monomer units which derive from PACM and nonanedioic acid, and the linear aliphatic polyamide b) is one described above.

In another embodiment, the PA PACMX may comprise monomer units which derive from PACM and decanedioic acid, and the linear aliphatic polyamide b) is one described above.

In another embodiment, the PA PACMX may comprise monomer units which derive from PACM and undecanedioic acid, and the linear aliphatic polyamide b) is one described above.

In another embodiment, the PA PACMX may comprise monomer units which derive from PACM and dodecanedioic acid, and the linear aliphatic polyamide b) is one described above.

In another embodiment, the PA PACMX may comprise monomer units which derive from PACM and tridecanedioic acid, and the linear aliphatic polyamide b) is one described above.

In another embodiment, the PA PACMX may comprise monomer units which derive from PACM and tetradecanedioic acid, and the linear aliphatic polyamide b) is one described above.

In another embodiment, the PA PACMX may comprise monomer units which derive from PACM and pentadecanedioic acid, and the linear aliphatic polyamide b) is one described above.

In another embodiment, the PA PACMX may comprise monomer units which derive from PACM and hexadecanedioic acid, and the linear aliphatic polyamide b) is one described above.

In another embodiment, the PA PACMX may comprise monomer units which derive from PACM and heptadecanedioic acid, and the linear aliphatic polyamide b) is described above.

In another embodiment, the PA PACMX may comprise monomer units which derive from PACM and octadecanedioic acid, and the linear aliphatic polyamide b) is one described above.

In addition to a) and b) the mixture of the invention may further comprise, other constituents which are preferably selected in such a way that they do not impair transparency or impair transparency only to the least possible extent. Examples of further constituents may include but are not limited to flame retardants, stabilizers, plasticizers, glass fibres, fillers, antistatic agents, dyes, pigments, mould-release agents, flow aids, compatibilizers and impact modifiers. The total quantity of these other constituents is at most 50% by weight, preferably at most 40% by weight, particularly preferably at most 30% by weight, with particular preference at most 20% by weight and very particularly preferably at most 10% by weight, or at most 5% by weight of the total mixture.

The compatibility of the components a) and b) with one another in the polyamide fraction of the mixture of the invention is generally sufficient to avoid any need to add compatibilizer. However, if compatibility is insufficient a compatibilizer may be added and should preferably be selected that it does not impair transparency of the mixture. When a compatibilizer is used the proportion thereof in the entire mixture is preferably from 0.1 to 10% by weight, particularly preferably from 0.3 to 8% by weight and very particularly preferably from 0.5 to 6% by weight.

Suitable compatibilizers may include but are not limited to polyamine-polyamide graft copolymers, copolymers which comprise anhydride groups, copolymers which comprise epoxy groups and copolymers which comprise oxazoline groups.

Polyamine-polyamide graft copolymers may be produced with use of the following monomers a) from 0.5 to 25% by weight, preferably from 1 to 20% by weight and particularly preferably from 1.5 to 16% by weight, based on the graft copolymer, of a branched polyamine having at least 4 and preferably at least 8 and particularly preferably at least 11 nitrogen atoms and a number-average molar mass $M_n$ of at least 146 g/mol and preferably of at least 500 g/mol, and also b) from 99.5 to 75% by weight of polyamide-forming monomers selected from lactams, ω-aminocarboxylic acids and/or equimolar combinations of diamine and dicarboxylic acid.

These graft copolymers are described in detail in EP 1 120 443 A2; the relevant disclosure in that document is incorporated into the present invention by reference. A particular advantage of the graft copolymers is that they do not impair transparency and that they improve flowability. In a preferred embodiment, with the exception of these graft copolymers that may be present, the mixture comprises no polyamides as other constituents.

Copolymers which comprise anhydride groups, epoxy groups or oxazoline groups are described in detail in WO 2008/025729 wherein they are used as adhesion promoters. The disclosure of that document relating to the copolymers is incorporated into the present invention by reference. It should be noted that these copolymers may act as crosslinking agents and increase melt viscosity during compounding or processing. They may moreover impair transparency.

In a preferred embodiment of the present invention, the mixture comprises no polymers as other components, with the exception of the polymeric compatibilizers that may be present.

Epoxy resins or bis- or polyoxazolines may be employed as compatibilizers. However, an increase of melt viscosity during compounding or processing may be expected.

In cases where compatibility of the components a) and b) is insufficient, but it is desirable to avoid use of compatibilizer, it may be possible to use amidation reactions in the melt in a known manner to produce block copolyamides which bring about compatibility. Measures available to the person skilled in the art include independently of one another or in combination, the following:

- the polyamide of the component a) and/or the polyamide of the component b) comprises a polycondensation catalyst, usually a phosphorus-containing acid;
- complementary terminal groups predominate in the respective polyamides of the components a) and b); such that one of the polyamides has an excess of terminal carboxy groups and that the other polyamide has an excess of terminal amino groups;
- the compounding or processing is carried out in the upper part of the available temperature range, for example at about 290 to 320° C.

The mixture of the invention, after mixing in the melt, may be transparent with transmittance of at least 85% and particularly at least 90%, and with haze of less than 3% and particularly less than 2%, both determined on injection-moulded test specimens of thickness 2 mm in accordance with ASTM D1003.

A particular feature of the moulded articles of the invention is the combination of high transparency, high toughness and high resistance to chemicals, to solvents and to stress cracking. Examples of possible application sectors are spectacle frames or spectacle lenses, and also components required to withstand high dynamic loads. The use of the mixture of the invention in such applications may increase lifetime. This is of great interest inter alia for components of sports shoes, for example shoe soles.

The invention moreover permits production of higher-quality films, for example for outer coverings of sports items such as skis or snowboards. This is apparent by way of example in higher tensile strain at break and, respectively, puncture resistance and increased self-healing capability of the material.

EXAMPLES

The invention is illustrated by examples below.
The following materials were used in the examples:
PA PACM12: microcrystalline polyamide produced from bis(4-aminocyclohexyl)methane with 48% content of trans, trans-stereoisomer, and also dodecanedioic acid; $\eta_{rel}=1.8$
PA 12 type 1: VESTAMID® L1600, a base-unit polyamide with $\eta_{rel}=1.6$
PA 12 type 2: VESTAMID® X1852, a base-unit polyamide with $\eta_{rel}=2.2$ Reference 1 and 2, and also Examples 1 to 5

The materials stated in Table 1 were mixed in the melt at 270° C. in a kneading assembly, extruded in the form of strand, pelletized and dried. The blends were then processed in an injection-moulding machine to give test specimens (melt temperature 280° C., mould temperature 80° C.). The results are shown in Table 1.

In Reference 1 and Reference 2 the two starting materials PA PACM12 and, respectively, VESTAMID L1600 were processed directly to give test specimens as a basis for comparison.

Example 6

80 parts by weight of PA PACM 12 and 20 parts by weight of PA12 type 2 were premixed in the form of pellets to give a solid mixture and processed to give mouldings in an injection-moulding machine (melt temperature 280° C.; mould temperature 80° C.). The results are shown in Table 1.

From Table 1 it is apparent that the best combination of breaking stress and notched impact resistance is present in Example 2 with the composition 80:20; both values become gradually poorer towards the limit of the invention (50:50). In DSC in this Example, the 2nd heating procedure revealed a glass transition temperature at 109.1° C., and also a broad melting peak with a maximum at 238.8° C. and with a small saddle at 252.8° C. This indicated that no individual phases of the two components were present, but instead a mixed phase was present, and that PA PACM12 and PA12 co-crystallize.

Not only the mouldings produced from the melt mixture but also those produced from the solids mixture exhibit—when compared to the PA PACM12 used—no reduction of high transparency, and also no change of low haze.

TABLE 1

| Properties | Method | Unit | Reference 1 | Reference 2 | Example 1 | Example 2 | Example 3 | Example 4 | Example 5 | Example 6 |
|---|---|---|---|---|---|---|---|---|---|---|
| Compositions and test results | | | | | | | | | | |
| Parts by weight of PA PACM12 | | | 100 | 0 | 90 | 80 | 70 | 60 | 50 | 80 |
| Parts by weight of PA12 type 1 | | | 0 | 100 | 10 | 20 | 30 | 40 | 50 | |
| Parts by weight of PA12 type 2 | | | | | | | | | | 20 |
| Tensile test (50 mm/min) | ISO 527 | | | | | | | | | |
| Yield stress | | MPa | 60.0 | 45 | 58.1 | 61.0 | 56.8 | 56.5 | 54.2 | 58.6 |
| Yield strain | | % | 8.3 | 5 | 6.5 | 7.2 | 6.6 | 6.3 | 5.8 | 7.0 |
| Breaking stress | | MPa | 63.0 | 57 | 55.6 | 63.1 | 56.3 | 55.3 | 53.8 | 57.8 |
| Tensile strain at break | | % | 195 | 200 | 348 | 245 | 226 | 382 | 426 | 325 |

TABLE 1-continued

Compositions and test results

| Properties | Method | Unit | Reference 1 | Reference 2 | Example 1 | Example 2 | Example 3 | Example 4 | Example 5 | Example 6 |
|---|---|---|---|---|---|---|---|---|---|---|
| Tensile modulus (1 mm/min) | | MPa | 1450 | 1400 | 1470 | 1460 | 1420 | 1470 | 1480 | 1450 |
| CHARPY impact resistance | ISO 179/1eU | | | | | | | | | |
| −30° C. | | kJ/m$^2$ | N$^{(a)}$ | N$^{(a)}$ | N$^{(a)}$ | N$^{(a)}$ | N$^{(a)}$ | N$^{(a)}$ | N$^{(a)}$ | N$^{(a)}$ |
| CHARPY notched impact resistance | ISO 179/1eA | | | | | | | | | |
| 23° C. | | kJ/m$^2$ | 11.7 C$^{(b)}$ | 5 C$^{(b)}$ | 6.7 C$^{(b)}$ | 9.3 C$^{(b)}$ | 7.9 C$^{(b)}$ | 6.9 C$^{(b)}$ | 4.8 C$^{(b)}$ | 8.5 C$^{(b)}$ |
| 0° C. | | | 11.4 C$^{(b)}$ | 5 C$^{(b)}$ | — | 10.2 C$^{(b)}$ | — | — | — | — |
| −30° C. | | | 11.2 C$^{(b)}$ | 5 C$^{(b)}$ | 7.7 C$^{(b)}$ | 11.2 C$^{(b)}$ | 9.6 C$^{(b)}$ | 8.6 C$^{(b)}$ | 7.6$^{(b)}$ | 9.6 C$^{(b)}$ |
| Transmittance | ISO 13468-2 | % | 90.8 | opaque | 90.8 | 91.2 | 91.2 | 91.3 | 91.0 | 91.3 |
| Haze | ASTM D1003 | % | 1.3 | — | 1.3 | 1.3 | 1.6 | 1.4 | 0.8 | 1.5 |

$^{(a)}$no fracture;
$^{(b)}$C = complete fracture, inclusive of hinge fracture </776

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:

1. A composition, comprising:
   at least 50% by weight of a polyamide fraction;
   the polyamide fraction consisting of:
   a) from 50 to 95 parts by weight of a polyamide consisting of copolymerized bis(4-aminocyclohexyl)methane (PACM) and a linear dicarboxylic acid having from 10 to 12 C atoms; and
   b) from 50 to 5 parts by weight of a linear aliphatic polyamide having an average of 12 C atoms in the monomer units,
   wherein the sum of the parts by weight of a) and b) is 100,
   a relative solution viscosity ($\eta_{rel}$) of the linear aliphatic polyamide b) is from 1.3 to 2.4; and
   a trans,trans-isomer content of the bis(4-aminocyclohexyl)methane (PACM) is from 30 to 70% by weight of total PACM.

2. The composition of claim 1, wherein the composition is in a form selected from the group consisting of a pellet mixture, a powder mixture and a blend.

3. The composition of claim 1, wherein the linear dicarboxylic acid is selected from the group consisting of decanedoic acid, undecanedoic acid and dodecanedoic acid.

4. The composition of claim 1, wherein an enthalpy of fusion of the polyamide a), measured in accordance with ISO 11357 in the 2nd heating procedure and with a heating and cooling rate of 20° C./min, is from 5 to 40 J/g.

5. The composition of claim 4, wherein the enthalpy of fusion of the polyamide a) is from 8 to 35 J/g.

6. The composition of claim 1, wherein a transmittance of an injection-moulded test specimen of thickness 2 mm of the polyamide a) is at least 85% and its haze is less than 3%, both determined in accordance with ASTM D1003.

7. The composition of claim 1, wherein the linear aliphatic polyamide b) is selected from the group consisting of PA12, PA1212, PA1113, PA1014, PA1410, PA816 and PA618.

8. The composition of claim 1, further comprising at most 50% by weight of at least one constituent selected from the group consisting of a flame retardant, a stabilizer, a plasticizer, glass fiber, a filler, an antistatic agent, a dye, a pigment, a mould-release agent, a flow aid, a compatibilizer and an impact modifier.

9. The composition of claim 8, wherein the at least one constituent is a compatibilizer for the polyamide a) and the linear aliphatic polyamide b).

10. The composition of claim 9, wherein the compatibilizer is a polyamine-polyamide graft copolymer comprising as copolymerized units:
    a) from 0.5 to 25% by weight, based on the graft copolymer, of a branched polyamine having at least 4 nitrogen atoms and a number-average molar mass $M_n$ of at least 146 g/1mol and
    b) from 99.5 to 75% by weight, based on the graft copolymer, of polyamide-forming monomers selected from the group consisting of a lactam, an ω-aminocarboxylic acid and an equimolar combination of a diamine and a dicarboxylic acid.

11. The composition of claim 10, wherein after mixing in a melt, a transmittance of an injection-moulded test specimen of thickness 2 mm is at least 85% and its haze is less than 3%, both determined in accordance with ASTM D1003.

12. An article obtained by moulding the composition of claim 1.

13. The article of claim 12, wherein the article is one selected from the group consisting of a film, a bristle and a fiber.

14. The article of claim 12, wherein the article is a spectacle frame or a spectacle lens.

15. The article of claim 12, wherein the article is a component of a sports shoe.

* * * * *